United States Patent
Pandharipande et al.

(10) Patent No.: US 12,518,629 B2
(45) Date of Patent: Jan. 6, 2026

(54) VEHICLE ACOUSTIC ALERT SIGNAL GENERATOR

(71) Applicant: NXP B.V., Eindhoven (NL)

(72) Inventors: Ashish Pandharipande, Eindhoven (NL); Christophe Marc Macours, Hodelge (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/816,127

(22) Filed: Aug. 27, 2024

(65) Prior Publication Data

US 2025/0078660 A1    Mar. 6, 2025

(30) Foreign Application Priority Data

Sep. 5, 2023   (EP) ..................................... 23195530

(51) Int. Cl.
  *G08G 1/16*   (2006.01)
  *B60Q 9/00*   (2006.01)

(52) U.S. Cl.
  CPC ............. *G08G 1/161* (2013.01); *B60Q 9/008* (2013.01); *G08G 1/166* (2013.01)

(58) Field of Classification Search
  None
  See application file for complete search history.

(56) References Cited

U.S. PATENT DOCUMENTS

| | | | |
|---|---|---|---|
| 10,315,563 B1 * | 6/2019 | Harper | B60Q 5/006 |
| 10,435,018 B2 * | 10/2019 | Kim | B60W 30/09 |
| 11,104,269 B2 * | 8/2021 | Karol | B60Q 5/006 |
| 11,273,848 B2 * | 3/2022 | Hao | G08G 1/015 |
| 11,577,722 B1 * | 2/2023 | Packer | G05D 1/0088 |
| 11,796,654 B2 * | 10/2023 | Slobodyanyuk | H04W 4/40 |
| 2017/0297568 A1 * | 10/2017 | Kentley | G05D 1/0291 |
| 2019/0001881 A1 | 1/2019 | You et al. | |
| 2020/0114816 A1 * | 4/2020 | Morimura | B60Q 1/442 |
| 2020/0234569 A1 * | 7/2020 | Wang | G05D 1/0276 |
| 2021/0114514 A1 | 4/2021 | Karol | |
| 2021/0383695 A1 * | 12/2021 | Kose Cihangir | G08G 1/163 |

(Continued)

FOREIGN PATENT DOCUMENTS

| | | |
|---|---|---|
| DE | 102013017626 A1 | 4/2015 |
| DE | 102016209552 A1 | 12/2017 |
| DE | 102021101260 A1 | 7/2022 |

OTHER PUBLICATIONS

Acts Adopted by Bodies Created by International Agreements, Official Journal of the European Union, L 9/33, Jan. 31, 2017.

(Continued)

*Primary Examiner* — Muhammad Adnan

(57) ABSTRACT

A method and apparatus for generating a vehicle acoustic alert signal for a vehicle comprising an acoustic vehicle alerting system (AVAS) is described. The method includes detecting and classifying an object. If the object is classified as a vulnerable road user (VRU), one or more VRU characteristics such as distance and velocity of the VRU are determined. An acoustic alert signal is generated and transmitted via the AVAS dependent on the at least one VRU characteristic. The at least one VRU characteristic is transmitted to a further vehicle for use in determining how the further vehicle generates an acoustic alert signal.

17 Claims, 8 Drawing Sheets

(56) References Cited

U.S. PATENT DOCUMENTS

2022/0388505 A1* 12/2022 Sharma Banjade ........................ G08G 1/096783
2023/0196920 A1*  6/2023 Naserian ............... B60W 30/09 701/26

OTHER PUBLICATIONS

Kournoutos, N., "Design of Electric Vehicle Warning Sound Systems to Minimise Drive-by Noise", Doctoral Thesis, University of Southampton, Oct. 29, 2020.

Li, Y., "Autonomous Vehicles Drive into Shared Spaces: eHMI Design Concept Focusing on Vulnerable Road Users", 2021 IEEE Intelligent Transportation Systems Conference (ITSC), Sep. 19-22, 2021.

Wilbrink, M., "Scaling up Automated Vehicles' eHMI Communication Designs to Interactions with Multiple Pedestrians—Putting eHMIs to the Test", in 13th International Conference on Automotive User Interfaces and Interactive Vehicular Applications (AutomotiveUI '21 Adjunct), Association for Computing Machinery, pp. 119-122, Sep. 2021.

\* cited by examiner

VEHICLE ACOUSTIC ALERT SIGNAL GENERATOR

CROSS-REFERENCE TO RELATED APPLICATIONS

This application claims the priority under 35 U.S.C. § 119 of European Patent application no. 23195530.3, filed on 5 Sep. 2023, the contents of which are incorporated by reference herein.

FIELD

The present disclosure relates to a method and apparatus for generating a vehicle acoustic alert signal.

BACKGROUND

An Acoustic Vehicle Alerting System (AVAS) is designed to emit vehicle warning sounds and alert vulnerable road users (VRUs) of the presence of vehicles. An AVAS is especially deemed important in electric drive vehicles that are much less noisy than current vehicles. An AVAS can be seen as an audio-centric external human machine interface (eHMI) needed for a vehicle to communicate with VRUs. Some AVAS systems use sound on a continuous basis to alert pedestrians of the presence of the vehicle when it is being driven at a low speed. Such systems have the adverse effect of increased sound pollution which may be addressed for example using automotive camera/radar to detect the presence of a VRU in the path of the vehicle and then actuating the AVAS.

SUMMARY

Aspects of the disclosure are defined in the accompanying claims. In a first aspect, there is defined a method of generating a vehicle acoustic alert signal for a vehicle comprising an acoustic vehicle alerting system and a RF transceiver the method comprising: detecting an object; classifying the object; and in response to classifying the object as a vulnerable road user: determining at least one VRU characteristic; generating an acoustic alert signal dependent on the at least one VRU characteristic; wirelessly transmitting via the RF transceiver the at least one VRU characteristic to a further vehicle; and transmitting the acoustic alert signal via the AVAS.

In some embodiments, the method comprises: wirelessly receiving at least one further VRU characteristic from the further vehicle; and generating the acoustic alert signal to be audibly distinct from a further acoustic alert signal generated by the further vehicle dependent on the at least one VRU characteristic and at least one further VRU characteristic.

In some embodiments, the acoustic alert signal is generated dependent on a distance between the vehicle and the VRU and a further distance between the further vehicle and the VRU. In some embodiments, the at least one VRU characteristic comprises a range of the vehicle from the VRU and the at least one further VRU characteristic comprises the range of the further vehicle from the VRU. In some embodiments, generating the acoustic alert signal to be audibly distinct from the further acoustic alert signal further comprises time domain interleaving the acoustic alert signal with respect to the further acoustic alert signal. In some embodiments, generating the acoustic signal adapted to be audibly distinct from the further acoustic alert signal further comprises frequency domain interleaving the acoustic signal with respect to the further acoustic alert signal.

In some embodiments, generating the acoustic signal adapted to be audibly distinct from the further acoustic alert signal further comprises adapting a sound power level of the acoustic signal dependent on the distance between the vehicle and the VRU. In some embodiments, the at least one VRU characteristic comprises a speed value. In some embodiments, the at least one VRU characteristic comprises a direction of motion value. In some embodiments, generating the acoustic alert signal further comprises beamforming the acoustic alert signal dependent on the at least one VRU characteristic. In some embodiments, detecting an object and classifying the object further comprises providing a detection system configured to detect and classify objects external to the vehicle. In some embodiments, the detection system is located in the vehicle. In some embodiments, the detection system is located at a fixed point external to the vehicle. In some embodiments, the detection system comprises one of a radar, lidar and camera.

In a second aspect, there is defined an apparatus comprising: an acoustic vehicle alerting system located in a vehicle, the AVAS comprising; a processor; an acoustic emitter array coupled to the processor; an RF transceiver coupled to the processor; an object detection system coupled to the AVAS, the object detection system comprising: a detector; and an object classifier having an object classifier input coupled to the detector and an object classifier output coupled to the processor; wherein the object detection system is configured to detect an object; classify the object; and in response to classifying the object as a vulnerable road user, VRU, determine at least one VRU characteristic; and wherein the processor is configured to: generate an acoustic alert signal dependent on the at least one VRU characteristic; wirelessly transmit via the RF transceiver the at least one VRU characteristic to a further vehicle; and transmit the acoustic alert signal via the AVAS.

In some embodiments, the processor is configured to: wirelessly receive at least one further VRU characteristic from the further vehicle; and generate the acoustic alert signal to be audibly distinct from a further acoustic alert signal generated by the further vehicle dependent on the at least one VRU characteristic and at least one further VRU characteristic. In some embodiments, the processor is configured to generate the acoustic alert signal dependent on a distance between the vehicle and the VRU and a further distance between the further vehicle and the VRU.

In some embodiments, the processor is configured to generate the acoustic alert signal adapted to be audibly distinct from the further acoustic alert signal by time domain interleaving the acoustic signal with respect to the further acoustic alert signal. In some embodiments, the processor is configured to generate the acoustic signal adapted to be audibly distinct from the further acoustic alert signal by frequency domain interleaving the acoustic signal with respect to the further acoustic alert signal. In some embodiments, the processor is configured to generate the acoustic signal adapted to be audibly distinct from the further acoustic alert signal by adapting the sound power level of the acoustic signal dependent on the distance between the vehicle and the VRU.

BRIEF DESCRIPTION OF THE DRAWINGS

In the figures and description like reference numerals refer to like features. Embodiments are now described in detail, by way of example only, illustrated by the accompanying drawings in which.

Figure 1:
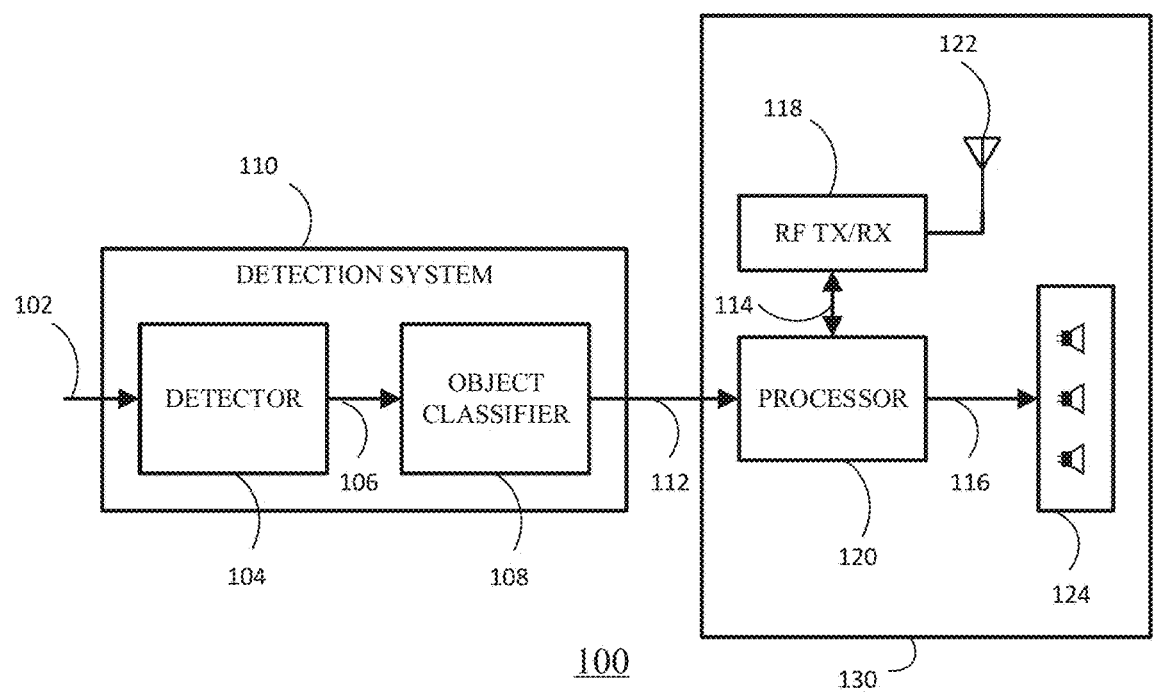
FIG. 1 shows a vehicle including a detection system and an acoustic vehicle alerting system (AVAS) according to an embodiment.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments.

DETAILED DESCRIPTION OF EMBODIMENTS

FIG. 1 shows a vehicle 100 including a detection system 110 and an acoustic vehicle alerting system 130 according to an embodiment. The detection system 110 includes a detector 104 having a detection input 102 and a detection output 106 connected to an object classifier input of object classifier 108. The object classifier 108 has an object classifier output connected to the detection system output 112. The AVAS 130 includes a processor 120 having an input connected to the detection system output 112 and a processor output 116 connected to an acoustic emitter array 124. The acoustic emitter array 124 may include one or more loudspeakers or other acoustic transducers which may be arranged as a co-located array or distributed around the vehicle 100. The processor 120 may also be connected via connection 114 to an RF transceiver 118 and associated antenna 122. Examples of a vehicle in this context include but are not limited to an automobile, van, truck, and motorcycle. The detector 104 may be implemented for example using radar, lidar or camera. The object classifier 108 may be implemented for example using a machine learning model. The processor 120 may be implemented in hardware, software or a combination of hardware and software.

Figure 2:
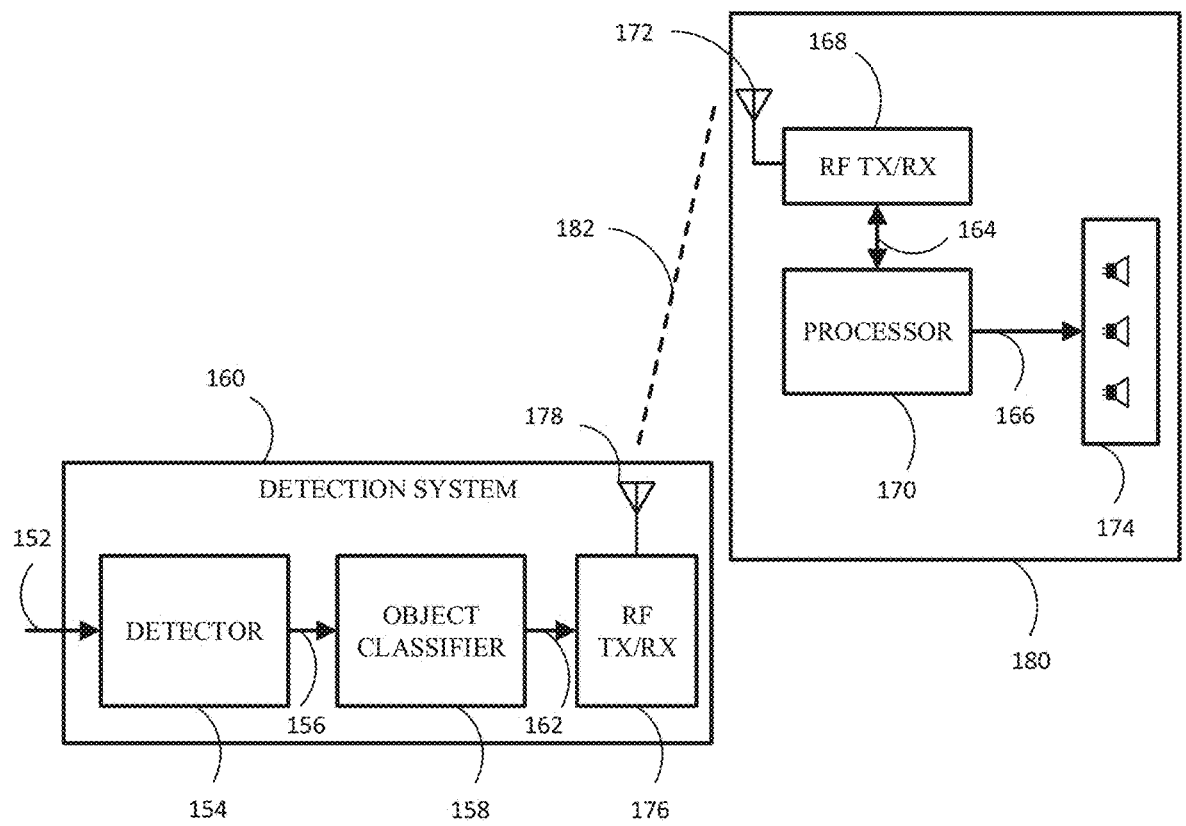
FIG. 2 shows an apparatus including an acoustic vehicle alerting system for a vehicle according to an embodiment.

FIG. 2 shows an apparatus 150 including an acoustic vehicle alerting system 180 for a vehicle according to an embodiment. Apparatus 150 includes a detection system 160 which may be at a fixed location, for example included in a mobile cellular network base station. The detection system 160 includes a detector 154 having a detection input 152 and detection output 156 connected to an object classifier input of an object classifier 158. The object classifier 158 has an object classifier output 162 connected to the input of a transceiver 176 and associated antenna 178. The AVAS 180 is located in a vehicle and includes a processor 170 having an input connected to the detection system output 112 and a processor output 166 connected to an acoustic emitter array 174. The acoustic emitter array 174 may include one or more loudspeakers or other acoustic transducers. The processor 170 may also be connected via connection 164 to an RF transceiver 168 and associated antenna 172. The detection system 160 may be wirelessly connected by wireless connection 182 to the AVAS system 180 via respective transceivers 176, 168 and antennas 178,172.

Figure 3:
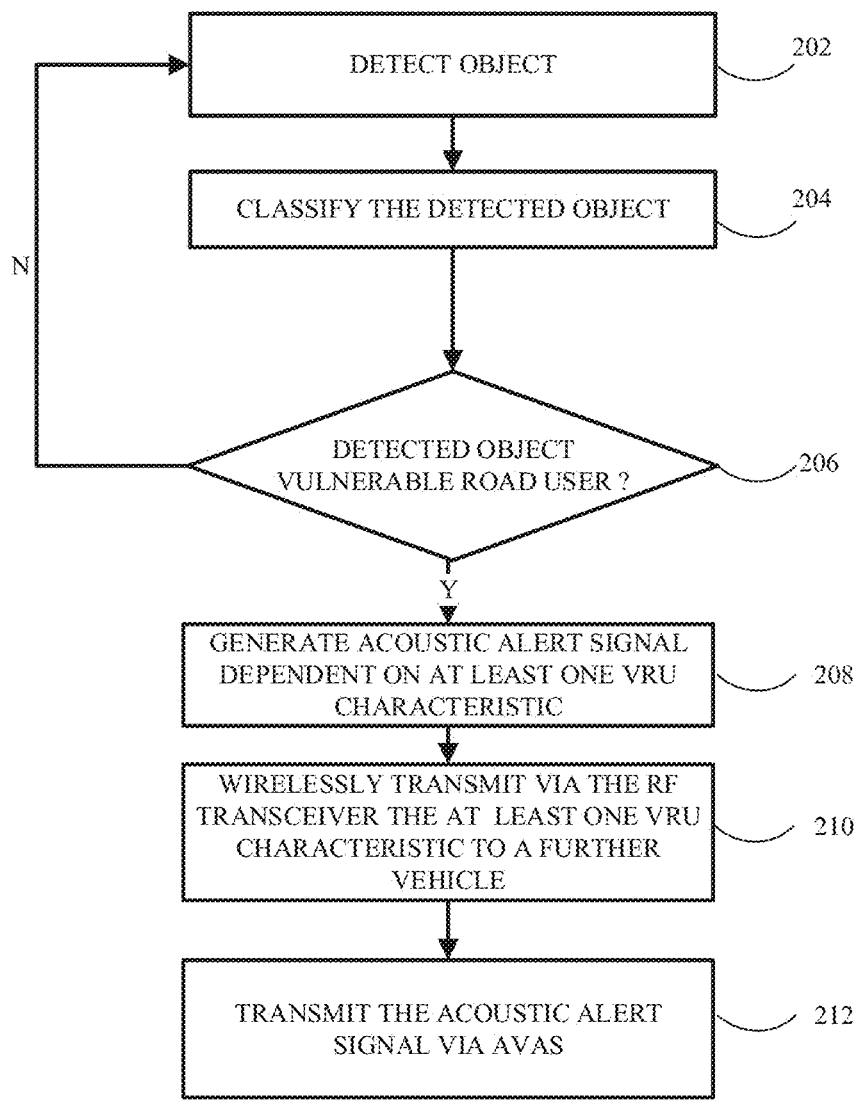
FIG. 3 shows a method of generating an acoustic vehicle alert for a vehicle comprising an acoustic vehicle alerting system according to an embodiment.

FIG. 3 shows a method of generating an acoustic vehicle alert 200 for a vehicle comprising an acoustic vehicle alerting system according to an embodiment. The method 200 may be implemented for example by vehicle 100 or apparatus 150. In step 202 an object may be detected for example by detector 104, 154 and classified in step 204 for example by object classifier 108, 158 which may be implemented as a machine learning model. In step 206, the method 200 may check whether the detected object is classified as a vulnerable road user (VRU) such as for example a pedestrian or a cyclist. If the object is not classed as a VRU, the method returns to step 202, otherwise the method proceeds to step 208 which generates an acoustic alert signal dependent on at least one VRU characteristic. The VRU characteristics may include for example the distance or range of the VRU from the vehicle, the speed of the VRU and the direction of motion of the VRU. For example the acoustic alert signal may be generated with a sound pressure level dependent on the range of the VRU or a frequency spectrum dependent on the speed and/or direction of motion of the VRU. In some examples, the acoustic alert signal may be generated to be audible only in predetermined time slots dependent on the distance of the VRU from the vehicle. Alternatively or in addition, in some examples, the acoustic alert signal may be generated within a particular audible frequency range dependent on the distance of the VRU from the vehicle. In step 210 one or more VRU characteristics may be transmitted to a further vehicle for generating an AVAS by the further vehicle. In step 212 the generated acoustic alert signal may be transmitted by the AVAS via for example via the acoustic emitter array 124, 174. In some examples the acoustic alert signal may be further adapted by beamforming dependent on the VRU direction and motion so that the acoustic alert signal is preferentially emitted in a direction towards the VRU. In some examples the acoustic emitter array may consist of a number of loudspeakers distributed around the vehicle. In these examples, only a subset of the loudspeakers may be actuated depending on the dependent on the VRU direction and motion so that the acoustic alert signal is preferentially emitted in a direction towards the VRU.

Figure 4:
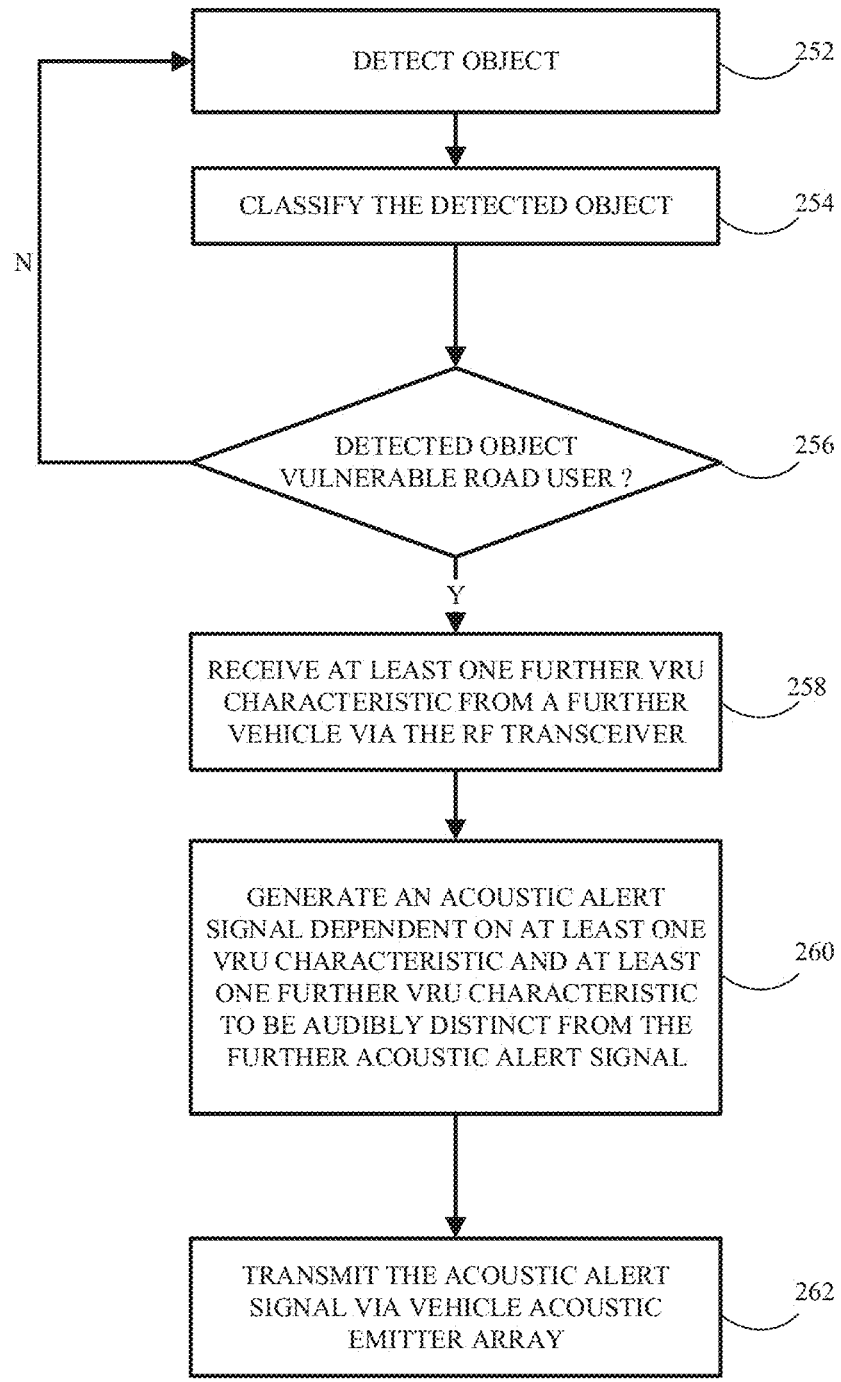
FIG. 4 shows a method of generating an acoustic vehicle alert for a vehicle comprising an acoustic vehicle alerting system according to an embodiment.

FIG. 4 shows a method of generating an acoustic vehicle alert 250 for a vehicle comprising an acoustic vehicle alerting system according to an embodiment. The method 250 may be implemented for example by vehicle 100 or apparatus 150. In step 252 an object may be detected for example by detector 104, 154 and classified in step 254 for example by object classifier 108, 158 which may be implemented as a machine learning model. In step 256, the method 250 may check whether the detected object is classified as a VRU and may determine one or more associated VRU characteristics. If the object is not classed as a VRU, the method returns to step 252, otherwise the method proceeds to step 258 where one or more further VRU characteristics of the same VRU detected by a further vehicle may be received from the further vehicle. In step 260 an acoustic alert signal may be generated dependent on one or more VRU characteristics determined by the vehicle and one or more further VRU characteristics determined by the further vehicle. For example the acoustic alert signal may be generated with a sound pressure level dependent on whether or not the vehicle is closer to the VRU than the further vehicle determined from the respective VRU characteristics. In some examples, the acoustic alert signal may be generated with a frequency spectrum dependent on the speed and/or direction of motion of the VRU. In some examples, the acoustic alert signal may be generated to be audible only in predetermined time slots dependent on the relative distance of the VRU from the vehicle and the further vehicle. Alternatively or in addition, in some examples, the acoustic alert signal may be generated within a particular audible frequency range dependent on the relative distance of the VRU from the vehicle and the further vehicle. In step 262 the generated acoustic alert signal may be transmitted by the AVAS via for example the acoustic emitter array 124. In some examples the acoustic alert signal may be further adapted by beamforming dependent on the VRU direction and motion so that the acoustic alert signal is preferentially emitted in a direction towards the VRU.

Figure 5A:
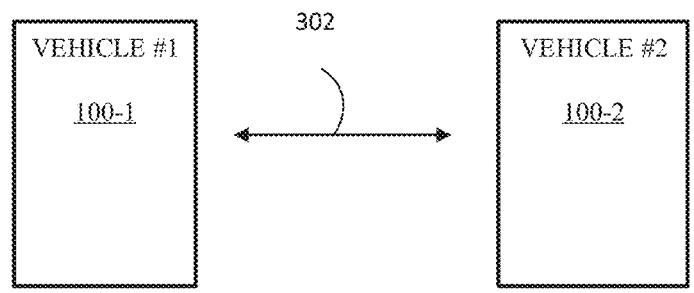
FIGS. 5A and 5B shows an example AVAS use case comprising two vehicles, each vehicle comprising an acoustic vehicle alerting system according to an embodiment.
Figure 5B:
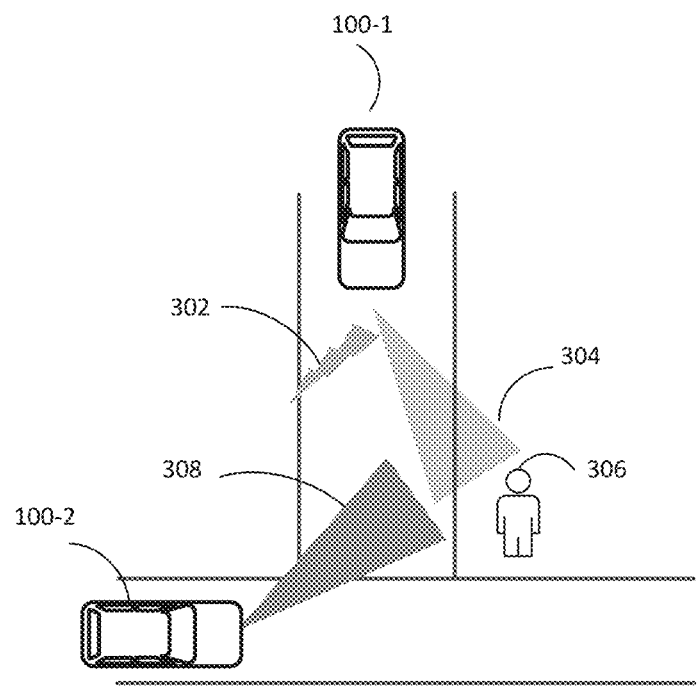

FIGS. 5A and 5B show an example AVAS system 300 comprising two vehicles 100-1, 100-2 which may be instances of vehicle 100. The respective detection system 110 of each of the vehicles 100-1, 100-2 detects objects in the immediate driving environment and perform object classification to determine that a VRU 306 for example a cyclist, pedestrian is present in the vicinity as previously described. As illustrated, the second vehicle 100-2 may be in a RF blind spot and so may not detect the presence of the VRU 306. The first vehicle 100-1 may detect the VRU and determine VRU characteristics including one or more of a range, speed, direction of motion with respect to the first vehicle 100-1 based on sensing measurements. The VRU characteristics determined by the first vehicle 100-1 may be transmitted by wireless connection 302 to the second vehicle 100-2 together with the location of the first vehicle 100-1 for example by transmitting GPS coordinates determined by a GPS receiver located in the first car and coupled to the AVAS (not shown). The second vehicle 100-2 may determine the position of the VRU 306 from the received VRU characteristics. The first and second vehicles 100-1, 100-2 may transmit respective acoustic alert signals 304, 308 via respective acoustic emitter arrays 124. The said actuation by a vehicle alerting system of the vehicles 100-1, 100-2 is in a specified region by beamforming the acoustic signal such that it is directed towards the VRU 306 to alert the VRU of approaching vehicles 100-1, 100-2.

In some examples, the AVAS may be generated so that the acoustic emitter arrays 124 are directed to indicate at least one characteristic of motion of the vehicle, for example speed, direction of motion and/or at least one characteristic of vehicle control, for example braking, acceleration, cruise control. This may be achieved for example by varying the pitch and/or sound pressure level of the acoustic alert. In addition, the sounds transmitted by the acoustic emitter arrays are processed to be perceived by the VRU 306 as spatially distinct acoustical events. This may be achieved by one or more of time domain interleaving, frequency domain interleaving and sound power level (SPL) adaptation as a function of the distance between the acoustic emitters and the VRU 306.

Figure 6A:
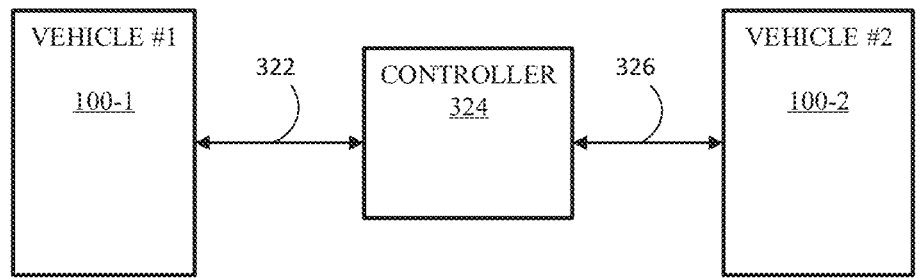
FIGS. 6A and 6B shows an example AVAS use case comprising two vehicles, each vehicle comprising an acoustic vehicle alerting system according to an embodiment.
Figure 6B:
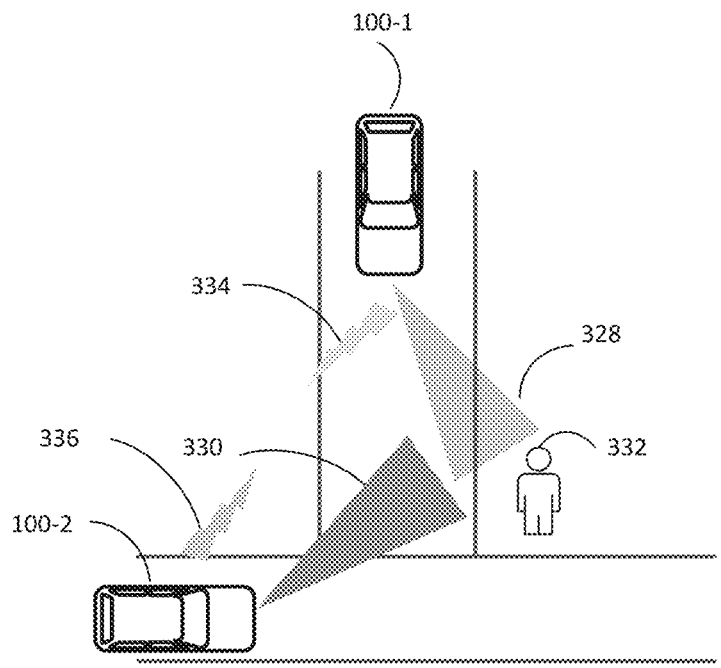

FIGS. 6A and 6B show an example AVAS system 320 comprising two vehicles 100-1, 100-2. The AVAS system 320 may include a controller 324 which may be implemented for example by software running on processor 120, 170. The controller 324 may have communication links 322, 326 between the vehicles 100-1, 100-2 and allows co-operative signaling between the vehicles 100-1, 100-2 to exchange information on VRU characteristics and determines which acoustic actuations occur in each vehicle 100-1, 100-2 such as for example actuation time and duration and/or and what frequency range to use. The respective detection system 110 of each of the vehicles 100-1, 100-2, which may be implemented as a radar system, detects objects in the immediate driving environment and performs object classification to determine that a VRU 332 for example a cyclist, pedestrian is present in the vicinity as previously described.

The first vehicle 100-1 may detect the VRU and determine VRU characteristics including one or more of a range, speed, direction of motion with respect to the first vehicle 100-1 based on sensing measurements. The VRU characteristics determined by the first vehicle 100-1 may be transmitted 334 to the second vehicle 100-2 together with the location of the first vehicle 100-1 for example by transmitting GPS coordinates determined by a GPS receiver located in the first car and coupled to the AVAS (not shown). The VRU characteristics determined by the second vehicle 100-2 may be transmitted 336 to the first vehicle 100-1 together with the location of the second vehicle 100-2 for example by transmitting GPS coordinates determined by a GPS receiver located in the second car and coupled to the AVAS (not shown). The first and second vehicles 100-1, 100-2 may transmit respective acoustic alert signals 328, 330 via an acoustic emitter array 124. The actuation by a vehicle alerting system of the vehicles 100-1, 100-2 in a specified region by beamforming the acoustic signal may be directed towards the VRU 332 to alert the VRU of approaching vehicles 100-1, 100-2 for example by beamforming.

The sounds transmitted by the acoustic emitter arrays are processed to be perceived by the VRU 332 as spatially distinct acoustical events. This may be achieved by one or more of time domain interleaving, frequency domain interleaving and sound power level (SPL) adaptation as a function of the distance between the acoustic emitters and the VRU 332. The controller 324 may determine for example which of the vehicles 100-1, 100-2 transmit in a specific time slot or allocate different frequency bands to the different vehicles 100-1, 100-2.

Figure 7A:
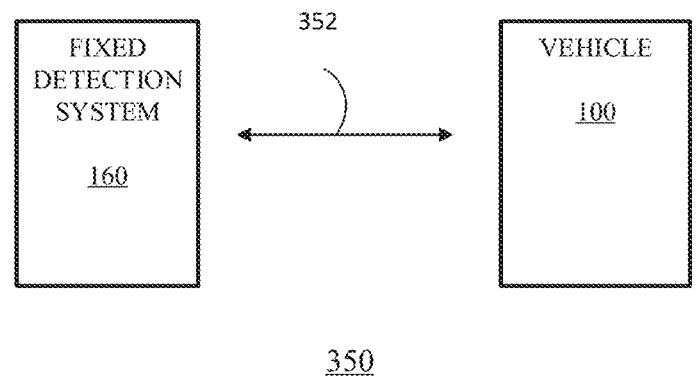
FIGS. 7A and 7B shows an example AVAS use case including one vehicle comprising an acoustic vehicle alerting system and a detector external to the vehicle according to an embodiment.
Figure 7B:
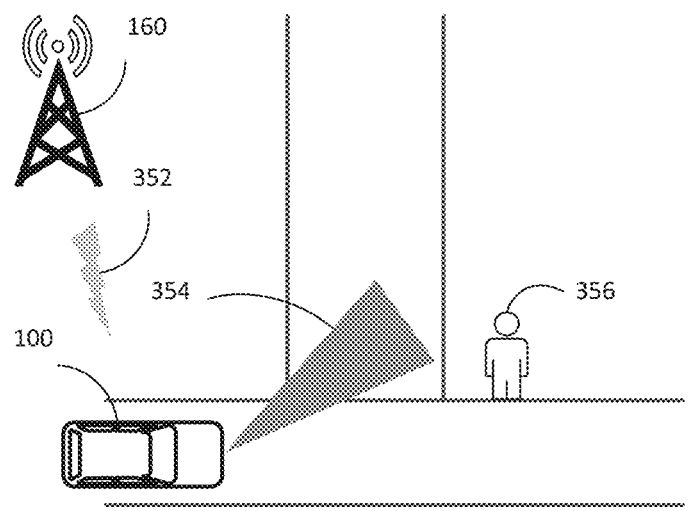

FIGS. 7A and 7B shows an example AVAS system 350 with a single vehicle 100 and a fixed detection system 160. The detection system 160 which may for example be implemented as a radar system may detect objects in the immediate driving environment and perform object classification to determine that a VRU 356 is present in the vicinity as previously described. In some examples, the detection system may be omitted from the vehicle and a vehicle may include an AVAS system 180. The detection system 160 may detect the VRU and determine VRU characteristics including one or more of a range, speed, direction of motion with respect to the detection system 160 based on sensing measurements. The VRU characteristics determined by the detection system 160 may be transmitted 352 to the vehicle 100 together with the location of the detection system 160 for example by transmitting GPS coordinates. The vehicle 100 may determine the position of the VRU 356 from the received VRU characteristics. The vehicle 100 may transmit an acoustic alert signals 354 via respective acoustic emitter array 124. In some examples, the AVAS of the vehicle 100 may beamform the acoustic signal such that it is directed towards the VRU 356 to alert the VRU of approaching vehicle 100.

Figure 8A:
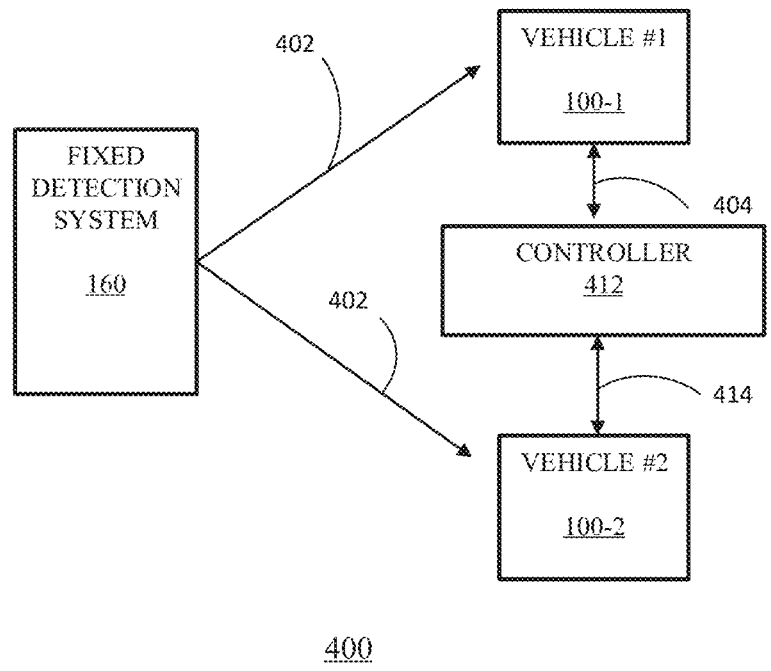
FIGS. 8A and 8B shows an example AVAS use case comprising two vehicles, each vehicle comprising an acoustic vehicle alerting system and a detector external to the vehicles according to an embodiment.
Figure 8B:
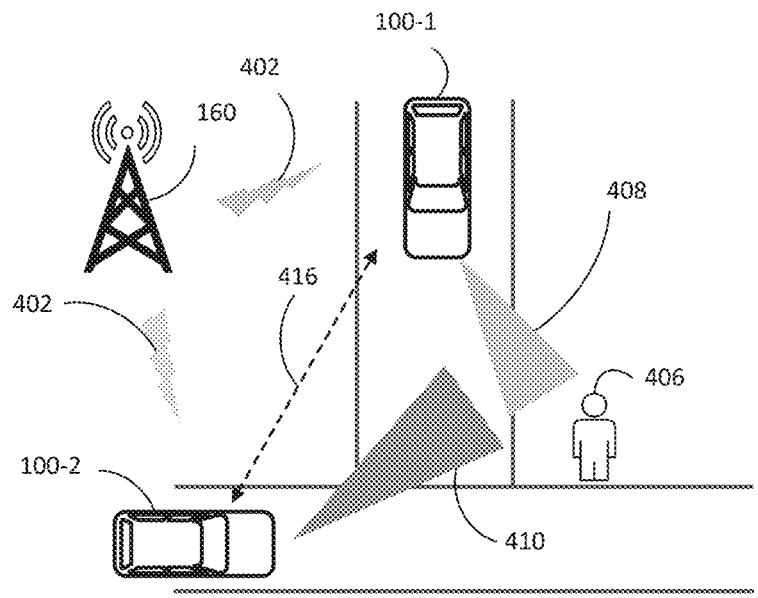

FIGS. 8A and 8B shows an example AVAS system 400 comprising two vehicles 100-1, 100-2 and a fixed detection system 160. In some examples, the detection system may be omitted from vehicles 100-1, 100-2 so for example a vehicle may just include an AVAS system 180. The AVAS system 400 may include a controller 412 which may be implemented for example by software running on processor 120, 170 i.e. included as part of the function of the processor 120, 170. The controller 412 may have communication links 404, 414 between the vehicles 100-1, 100-2 and allows co-operative signaling between the vehicles 100-1, 100-2 to exchange information on VRU characteristics and determines which acoustic actuations occur in each vehicle 100-1, 100-2 such as for example actuation time and duration and/or and what frequency range to use. The detection system 160 may detect the VRU 406 and determine VRU characteristics including one or more of a range, speed, direction of motion with respect to the detection system 160 based on sensing measurements. The VRU characteristics determined by the detection system 160 may be transmitted 402 to the vehicles 100-1, 100-2 together with the location of the detection system 160 by for example transmitting GPS coordinates. The first and second vehicles 100-1, 100-2 may exchange VRU characteristics and respective location information via link 416. The first and second vehicles 100-1, 100-2 may transmit respective acoustic alert signals 408, 410 via respective acoustic emitter arrays 124. The transmit respective acoustic alert signals 408, 410 may be confined to a specified region, for example by beamforming the acoustic signal such that it is directed towards the VRU 406.

The sounds transmitted by the acoustic emitter arrays are processed to be perceived by the VRU 406 as spatially distinct acoustical events. This may be achieved by one or more of time domain interleaving, frequency domain interleaving and sound power level (SPL) adaptation as a function of the distance between the acoustic emitters and the VRU 406. The controller 412 may determine for example which of the vehicles 100-1, 100-2 transmit in a specific time slot or allocate different frequency bands to the different vehicles 100-1, 100-2.

Figure 9:
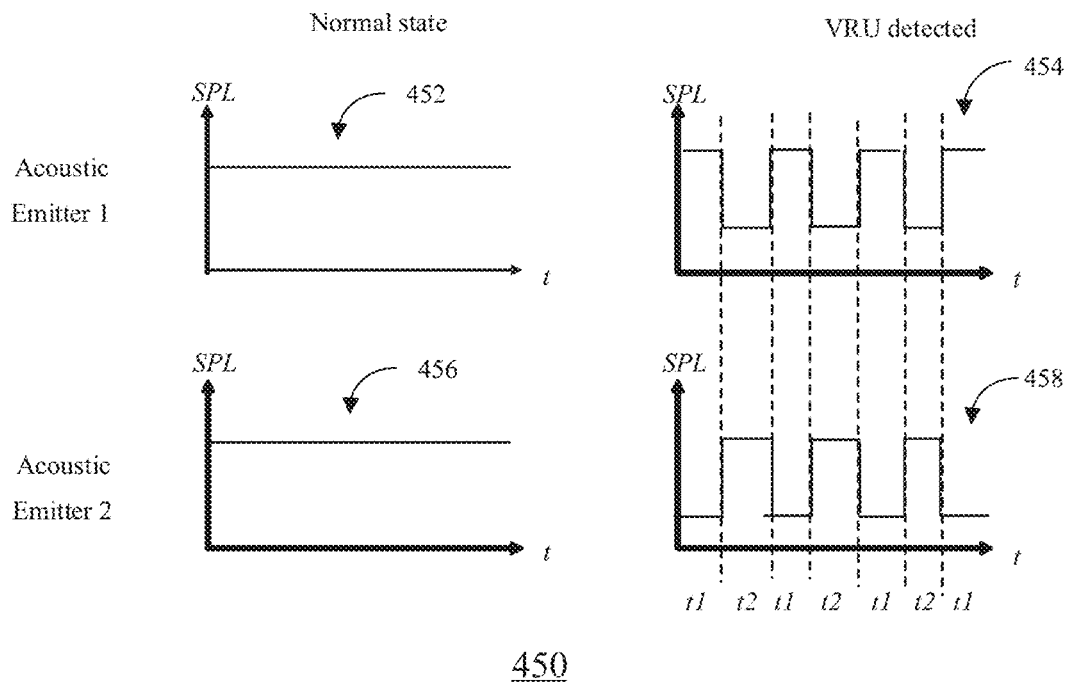
FIG. 9 shows an example AVAS generation waveform for two vehicles using time domain interleaving, each vehicle comprising an acoustic vehicle alerting system according to an embodiment.

FIG. 9 illustrates an example of time-interleaving 450 for two acoustic emitters which can be used for example so that a VRU perceives an alert signal from each acoustic emitter as a spatially distinct acoustical event. Graph 452 shows the sound pressure level (SPL) versus time in a normal state for a first acoustic emitter. Graph 454 shows the sound pressure level versus time when a VRU is detected for the first acoustic emitter. Graph 456 shows the sound pressure level versus time in a normal state for a second acoustic emitter. Graph 458 shows the sound pressure level versus time for the second acoustic emitter when a VRU is detected. During the normal state the SPL may be a constant value for both acoustic emitters. When a VRU is detected the first acoustic emitter may transmit in first time slots t1 and the second acoustic emitter may transmit in second non-overlapping time slots t2. The time slot to use may be determined for example by the relative distance of the vehicle or vehicles to the VRU. For example, the closest vehicle to the VRU may use the first time slots t1 and the other vehicle may use the second time slots t2. For more than two vehicles, multiple predefined time slots may be defined.

Figure 10:
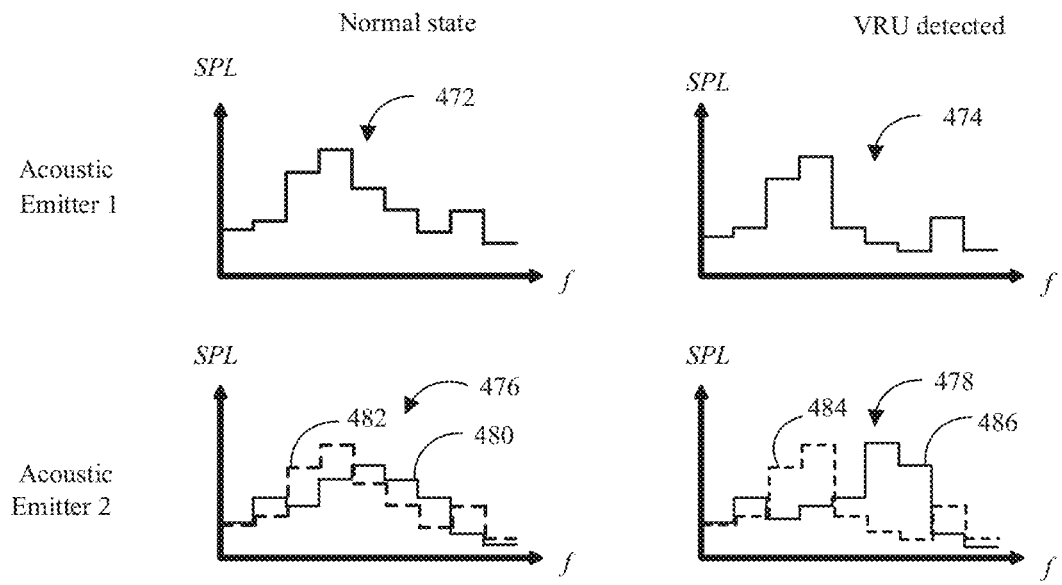
FIG. 10 shows an example AVAS generation waveform for two vehicles using frequency domain interleaving, each vehicle comprising an acoustic vehicle alerting system according to an embodiment.

FIG. 10 illustrates an example of frequency-interleaving 470 for two acoustic emitters which can be used for example so a VRU perceives an alert signal from each acoustic emitter as a spatially distinct acoustical event. Graph 472 shows the sound pressure level (SPL) versus frequency in a normal state for a first acoustic emitter. Graph 474 shows the sound pressure level versus frequency when a VRU is detected for the first acoustic emitter. Graph 476 shows the sound pressure level versus frequency in a normal state for a second acoustic emitter indicated by line 480 versus first acoustic emitter shown by line 482. Graph 478 shows the sound pressure level versus frequency for the second acoustic emitter when a VRU is detected for a second emitter indicated by line 486 versus first acoustic emitter shown by line 484. During the normal state, the frequency ranges of the SPL may be overlapping. When a VRU is detected the first acoustic emitter may transmit in a first frequency spectrum which is shifted with respect to the second acoustic emitter.

A collaborative acoustic vehicle alerting system actuated by a distributed automotive sensing system for alerting vulnerable road users is described. The VRU is detected by one or more automotive sensors or an external fixed sensor and information on parameters such as range (distance), velocity and angular information of VRU detected by vehicles or an external detector is exchanged to determine which one or more AVAS to actuate. The one or more AVAS may then be actuated for example using time and/or frequency multiplexing in a manner such that the acoustic alert does not enhance acoustic noise and alerts the VRU of distinct approaching vehicles. The method and apparatus described may provide a closed-loop distributed AVAS system that uses cooperative perception from multiple vehicles. The illustrated embodiments described herein refer to two vehicles. However, in other examples, three or more vehicles including an AVAS may exchange VRU characteristics and generate an AVAS signal in a similar way to that as described in the illustrated embodiments.

A method and apparatus for of generating a vehicle acoustic alert signal for a vehicle comprising an acoustic vehicle alerting system (AVAS) is described. The method includes detecting and classifying an object. If the object is classified as a vulnerable road user (VRU), one or more VRU characteristics such as distance and velocity of the VRU are determined. An acoustic alert signal is generated and transmitted via the AVAS dependent on the at least one VRU characteristic. The at least one VRU characteristic is transmitted to a further vehicle for use in determining how the further vehicle generates an acoustic alert signal.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

Example embodiments of the material discussed in this specification can be implemented in whole or in part through network, computer, or data based devices and/or services.

These may include cloud, internet, intranet, mobile, desktop, processor, look-up table, microcontroller, consumer equipment, infrastructure, or other enabling devices and services. As may be used herein and in the claims, the following non-exclusive definitions are provided.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of generating a vehicle acoustic alert signal for a vehicle comprising an acoustic vehicle alerting system, AVAS, and a RF transceiver the method comprising:
   detecting an object;
   classifying the object; and
   in response to classifying the object as a vulnerable road user, VRU:
   determining at least one VRU characteristic;
   generating an acoustic alert signal dependent on the at least one VRU characteristic;
   wirelessly transmitting via the RF transceiver the at least one VRU characteristic to a further vehicle; and
   transmitting the acoustic alert signal via the AVAS;
   wherein the acoustic alert signal is generated dependent on a distance between the vehicle and the VRU and a further distance between the further vehicle and the VRU.

2. The method of claim 1 further comprising:
   wirelessly receiving at least one further VRU characteristic from the further vehicle; and
   generating the acoustic alert signal to be audibly distinct from a further acoustic alert signal generated by the further vehicle dependent on the at least one VRU characteristic and at least one further VRU characteristic.

3. The method of claim 2, wherein the at least one VRU characteristic comprises a range of the vehicle from the VRU and the at least one further VRU characteristic comprises the range of the further vehicle from the VRU.

4. The method of claim 3, wherein generating the acoustic alert signal to be audibly distinct from the further acoustic alert signal further comprises time domain interleaving the acoustic alert signal with respect to the further acoustic alert signal.

5. The method of claim 3, wherein generating the acoustic signal adapted to be audibly distinct from the further acoustic alert signal further comprises frequency domain interleaving the acoustic signal with respect to the further acoustic alert signal.

6. The method of any of claim 3, wherein generating the acoustic signal adapted to be audibly distinct from the further acoustic alert signal further comprises adapting a sound power level of the acoustic signal dependent on the distance between the vehicle and the VRU.

7. The method of claim 1, wherein the at least one VRU characteristic comprises a speed value.

8. The method of claim 1, wherein the at least one VRU characteristic comprises a direction of motion value.

9. The method of claim 1, wherein generating the acoustic alert signal further comprises beamforming the acoustic alert signal dependent on the at least one VRU characteristic.

10. The method of claim 1, wherein detecting an object and classifying the object further comprises providing a detection system configured to detect and classify objects external to the vehicle.

11. The method of claim 10, wherein the detection system is located in the vehicle.

12. The method of claim 10, wherein the detection system comprises one of a radar, lidar and camera.

13. An apparatus comprising:
    an acoustic vehicle alerting system, AVAS, located in a vehicle, the AVAS comprising;
    a processor; an acoustic emitter array coupled to the processor; an RF transceiver coupled to the processor;
    an object detection system coupled to the AVAS, the object detection system comprising:
    a detector; and
    an object classifier having an object classifier input coupled to the detector and an object classifier output coupled to the processor;
    wherein the object detection system is configured to detect an object; classify the object; and
    in response to classifying the object as a vulnerable road user, VRU, determine at least one VRU characteristic; and
    wherein the processor is configured to:
    generate an acoustic alert signal dependent on the at least one VRU characteristic;
    wirelessly transmit via the RF transceiver the at least one VRU characteristic to a further vehicle; and transmit the acoustic alert signal via the AVAS; and
    generate the acoustic alert signal dependent on a distance between the vehicle and the VRU and a further distance between the further vehicle and the VRU.

14. The apparatus of claim 13 wherein the processor is configured to:
    wirelessly receive at least one further VRU characteristic from the further vehicle; and
    generate the acoustic alert signal to be audibly distinct from a further acoustic alert signal generated by the further vehicle dependent on the at least one VRU characteristic and at least one further VRU characteristic.

15. The apparatus of claim 14, wherein the processor is further configured to generate the acoustic alert signal adapted to be audibly distinct from the further acoustic alert signal by time domain interleaving the acoustic signal with respect to the further acoustic alert signal.

16. The apparatus of claim 14, wherein the processor is further configured to generate the acoustic signal adapted to be audibly distinct from the further acoustic alert signal by frequency domain interleaving the acoustic signal with respect to the further acoustic alert signal.

17. The apparatus of claim 14, wherein the processor is further configured to generate the acoustic signal adapted to be audibly distinct from the further acoustic alert signal by adapting a sound power level of the acoustic signal dependent on a distance between the vehicle and the VRU.

\* \* \* \* \*